US008670895B2

(12) United States Patent
Chinnadurai et al.

(10) Patent No.: US 8,670,895 B2
(45) Date of Patent: Mar. 11, 2014

(54) VEHICULAR DIAGNOSTIC TOOL WITH DETACHABLE MEMORY AND METHOD OF OPERATION THEREOF

(75) Inventors: Manokar Chinnadurai, Owatonna, MN (US); Stefano Coruzzi, Felino (IT); Ed Lipscomb, Lakeville, MN (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 340 days.

(21) Appl. No.: 12/849,169

(22) Filed: Aug. 3, 2010

(65) Prior Publication Data

US 2011/0035095 A1 Feb. 10, 2011

Related U.S. Application Data

(60) Provisional application No. 61/232,025, filed on Aug. 7, 2009.

(51) Int. Cl.
*G01M 17/00* (2006.01)
*G06F 7/00* (2006.01)

(52) U.S. Cl.
USPC .......................................... 701/31.9; 701/32.1

(58) Field of Classification Search
USPC .......................................... 701/33, 31.9, 32.1
See application file for complete search history.

(56) References Cited

U.S. PATENT DOCUMENTS 7,502,672 B1 * 3/2009 Kolls .......................... 701/31.6
2001/0040504 A1 * 11/2001 Gehlot .......................... 340/426

* cited by examiner

*Primary Examiner* — Mary Cheung
*Assistant Examiner* — Frederick Brushaber
(74) *Attorney, Agent, or Firm* — Baker & Hostetler LLP

(57) ABSTRACT

A vehicle diagnostic tool configured to interface with a removable memory device. The removable memory device is configured to store information about the vehicle such as, for example, the maintenance history of the vehicle and notes or special instructions from one or more mechanics having performed the maintenance. The memory device, once disengaged from the diagnostic tool, is given to the vehicle's owner for safekeeping and may be incorporated in a key, fob or other device that the owner would often have available when operating the vehicle. Also, a method of collecting and storing vehicle data is also provided.

18 Claims, 3 Drawing Sheets

VEHICULAR DIAGNOSTIC TOOL WITH DETACHABLE MEMORY AND METHOD OF OPERATION THEREOF

CROSS REFERENCE TO RELATED APPLICATIONS

This application claims benefit of U.S. Provisional Application No. 61/232,025, entitled "Vehicular Diagnostic Tool with Detachable Memory and Method of Operation Thereof;" filed Aug. 7, 2009, which is hereby incorporated by reference in its entirety.

FIELD OF THE INVENTION

The present invention relates generally to devices and systems designed to perform diagnostic tests on vehicular systems. The present invention also relates generally to methods for testing vehicular systems.

BACKGROUND OF THE INVENTION

When today's vehicle owners (i.e., owners of automobiles, motorcycles, boats, farm equipment, etc.) need their vehicles maintained (e.g., repaired, tuned up, etc.), many take their vehicles to repair shops that specialize in their types of vehicles. Once at a repair shop, a mechanic typically connects a vehicular diagnostic tool (i.e., a "scan tool") to a vehicle to obtain a preliminary assessment of the problems associated therewith. Based on this assessment, the mechanic performs the prescribed maintenance and, subsequently, re-tests the vehicle with the diagnostic tool to confirm that the problem has been resolved.

Pursuant to the above-mentioned diagnostic testing, repair and confirmation of the adequacy of the repair, a summary of the work performed is printed on a sheet of paper that either is the customer's invoice itself or is attached to the invoice. After the customer pays for the work that has been performed, a copy of the summary is given to the customer to take home and file away in his or her records.

Unfortunately, many vehicle owners have difficulty keeping track of maintenance records over time when they are printed on paper. As such, it is not always clear to a mechanic seeing a vehicle for the first time what kind of repairs the vehicle has previously undergone. Also, even if paper copies of the maintenance records are properly stored by the vehicle's owner and supplied to a mechanic when requested, sorting through the paper records is not generally a particularly efficient use of the mechanic's time.

SUMMARY OF THE INVENTION

At least in view of the above, it would be desirable to provide novel vehicular diagnostic tools that are configured to provide owners of vehicles with accurate and complete maintenance histories for their vehicles in electronic form. It would also be desirable for these maintenance histories to be compact, easy to maintain, easy to input into other diagnostic tools in the future and relatively easy to keep track of. It would also be desirable to provide novel methods for providing such maintenance histories.

The foregoing needs are met, to a great extent, by one or more embodiments of the present invention. According to one such embodiment, a vehicle diagnostic tool is provided, which can include a vehicle interface configured to be connected to a vehicle and to communicate with the vehicle, a processor configured to perform a diagnostic test on a system within the vehicle by communicating with the vehicle through the vehicle interface, a removable memory device configured to store data collected during the diagnostic test, wherein the memory device is retained by an owner of the vehicle after the diagnostic test has been performed, and a data storage interface electronically connected to the processor and configured to receive the removable memory device.

In accordance with another embodiment of the present invention, a method of storing vehicular data is provided, which can perform a diagnostic test on a vehicle system using a vehicle diagnostic tool, store information related to the diagnostic test on a removable memory device that is removably engaged with the vehicle diagnostic tool, and provide the removable memory device to an operator of the vehicle after the diagnostic test has been completed and the information having been stored on the removable memory device.

In accordance with yet another embodiment of the present invention, another vehicular diagnostic tool is provided, which can include means for interfacing configured to be connected to a vehicle and to communicate with the vehicle, means for processing configured to perform a diagnostic test on a system within the vehicle by communicating with the vehicle through the means for interfacing, means for storing configured to store data collected during the diagnostic test, wherein the means for storing is retained by an owner of the vehicle after the diagnostic test has been performed, and a means for receiving electronically connected to the means for processing and configured to receive the means for storing.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
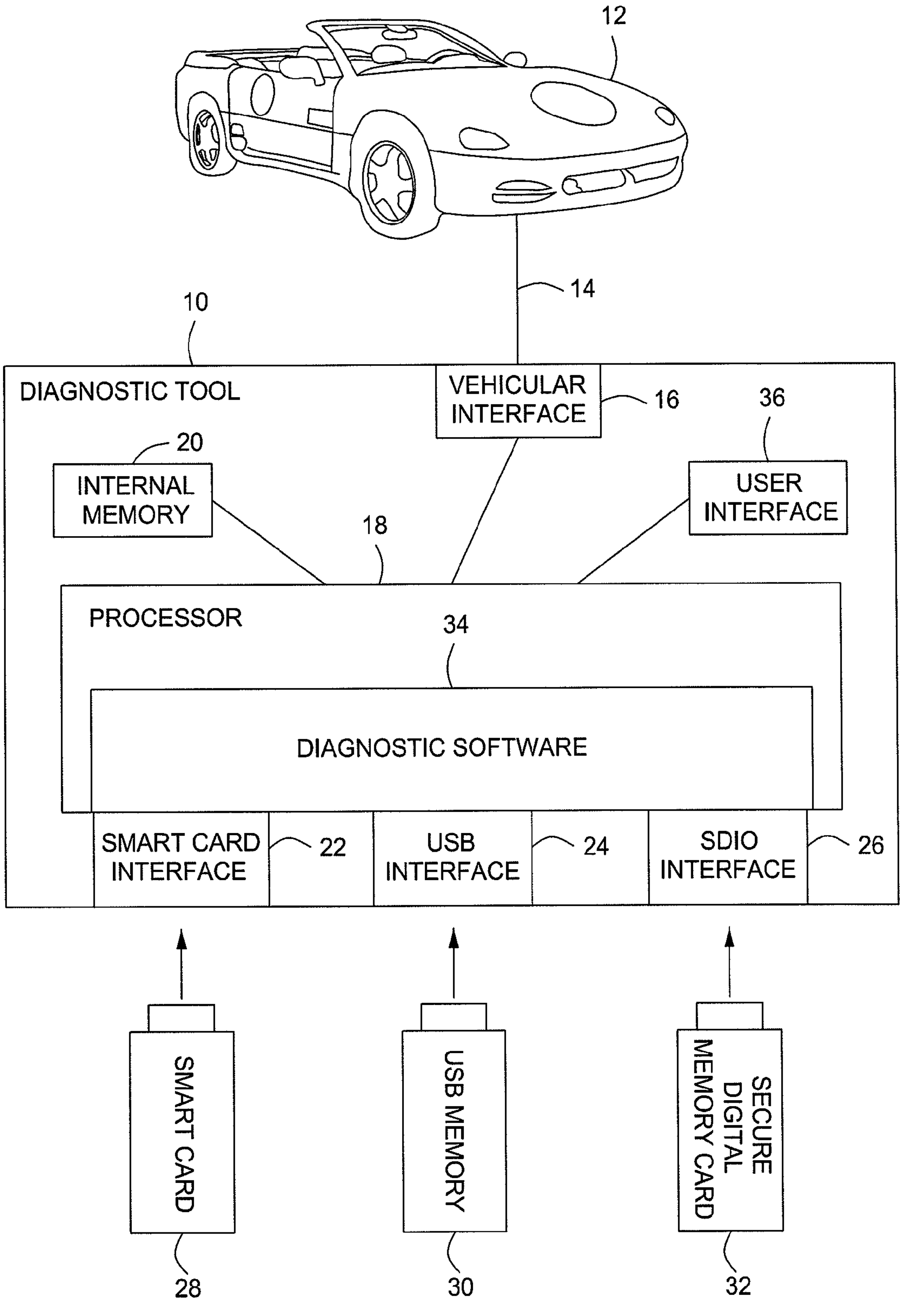
FIG. 1 is a schematic diagram of a vehicle diagnostic tool according to an embodiment of the present invention.

The invention will now be described with reference to the drawing figures, in which like reference numerals refer to like parts throughout. FIG. 1 is a schematic diagram of a vehicle diagnostic tool 10 according to an embodiment of the present invention as it is connected to a vehicle 12 through a cable 14. Although the vehicle 12 illustrated in FIG. 1 is an automobile, other vehicles (e.g., motorcycles, farm equipment, industrial machinery, boats, planes, helicopters, trains, etc.) are also within the scope of the present invention. The cable 14 may be any cable that is configured to be connected between one or more electronic systems within the vehicle 12 and the diagnostic tool 10 and to enable communication therebetween. For example, an OBDII cable may be used with appropriate interfaces to the vehicle 12 and diagnostic tool 10. In another embodiment, the diagnostic tool contains the necessary hardware and software to wirelessly communicate with the vehicle electronic control units (or diagnostic computers) and thus cable 14 will not be needed.

As illustrated in FIG. 1, the diagnostic tool 10 includes a vehicular interface 16 that is configured to be connected to the vehicle 12 and that is further configured to communicate with the vehicle 12, typically through the cable 14. In other words, the vehicular interface 16 may receive signals and/or data from the vehicle 12 and may send signals (e.g., instructions) and/or data to electronic systems within the vehicle 12.

FIG. 1 also illustrates that the diagnostic tool 10 includes a processor 18. This processor 18 is configured to perform a diagnostic test on one or more systems within the vehicle 12 by communicating with the vehicle 12 through the vehicular interface 16. For example, the processor 18 may monitor the rotations per minute of components within the vehicle's engine, may test the amount of current and/or voltage in the vehicle's lighting system and/or may monitor the hydraulic pressure in the vehicle's anti-lock braking system. The processor can also perform additional processing as needed to operate the diagnostic tool 10.

Data collected during any test according to the present invention may optionally be stored in an internal memory 20 that is coupled to processor 18 as illustrated in FIG. 1. The internal memory 20 may also store, for example, data needed to conduct diagnostic tests (e.g., data from manufacturers about particular vehicular makes and models), software code and/or any other information that would become apparent to one of skill in the art as useful upon practicing one or more embodiments of the present invention.

Also illustrated in FIG. 1 is a set of data storage interfaces 22, 24, 26. More specifically, a smart card interface 22, a universal serial bus (USB) memory interface 24 and a secure digital input/output (SDIO) memory card interface 26 are illustrated. Each interface 22, 24, 26 is electronically connected to the processor 18 and is configured to receive a compatible removable memory device. In another embodiment, there can be one universal data storage interface that will accept various removable memory devices.

Illustrated adjacent to each interface 22, 24, 26 in FIG. 1 is a compatible removable memory device. More specifically, a smart card 28 is illustrated adjacent to the smart card interface 22, a USB memory 30 is illustrated adjacent to the USB memory interface 24 and a secure digital memory card 32 is illustrated adjacent to the SDIO memory card interface 26.

Although virtually any geometry may be used according to the present invention, the smart card 28 illustrated in FIG. 1 is substantially credit-card-sized. Also, although other materials may be used, the illustrated smart card 28 illustrated in FIG. 1 is made out of a polymer and has an integrated circuit included therein. Within the integrated circuit, non-volatile and/or volatile memory may be included. Also, according to certain embodiments of the present invention, the integrated circuit may possess data processing capabilities in the form of, for example, a microprocessor. The smart card can be in any size or shape and is not limited to the embodiments disclosed herein.

The USB memory 30, which according to certain embodiments of the present invention may be replaced with any other type of memory, includes a flash memory with a USB interface. No particular restrictions are placed on the geometry, size or weight of the USB memory 30 according to the present invention. Also, a wide range of materials may be included in the USB memory 30 according to embodiments of the present invention.

In contrast to the USB memory 30, the secure digital memory card 32 includes non-volatile memory. However, devices including both volatile and non-volatile memory are also within the scope of the present invention. No particular restrictions are made on the size, geometry or weight of the secure digital memory card 32 or on the materials included therein. Other types of removal memory media are also contemplated such as compact disc (CD), digital video disc (DVD), memory stick (Sony), hard drives, and other removable memory media.

Another component illustrated in FIG. 1 is a diagnostic software module 34 that is connected to each of the removable memory interfaces 22, 24, 26 and that is included within the processor 18. Using the diagnostic software module 34, as mentioned above, the processor 18 is capable of implementing any of the above-mentioned diagnostic tests on systems within the vehicle 12. It should also be noted that, using the diagnostic software module 34, data collected during one or more diagnostic tests may be saved, either temporarily or for a relatively long term (e.g., days, months or years), on the internal memory 20 or on any type of removable memory that is compatible with the diagnostic tool 10 (e.g., smart card 28, USB memory 30, secure digital memory card 32, etc.). The diagnostic software module 34 may also be located on the internal memory 20 or on a removable memory device.

In addition to the above method of data storage, according to certain embodiments of the present invention, diagnostic test data is stored in the internal memory 20 and a copy of the diagnostic data is stored on a removable memory device 38. That way, data can remain on the internal memory 20 of the diagnostic tool 10 in the vehicle repair shop where the tests were conducted and the removable memory 38 (FIG. 2 or 28, 30, 32 of FIG. 1) can be given to the owner of the vehicle for safekeeping. Also, the data would remain available for later transfer to another repair shop if, for example, the original repair shop goes out of business or if the owner moves away from the original repair shop. According to other embodiments of the present invention, the data collected is stored on the internal memory 20 until a more permanent storage location (e.g., a personal computer) can be interfaced with the diagnostic tool 10. At that time, the data can be transferred to the more permanent storage location and deleted from the internal memory 20.

The final component illustrated in FIG. 1 is a user interface 36. According to certain embodiments of the present invention, the user interface 36 is used simply to turn the diagnostic tool 10 on or off and/or to initiate and/or terminate a diagnostic test being performed on the vehicle 12. According to other embodiments, however, the user interface 36 is a relatively sophisticated interface wherein an operator of the diagnostic tool 10 may see test results presented graphically on a display (not shown) and/or may control many or all aspects of a diagnostic test being conducted. As such, the user interface 36 may include, for example, a display screen, a touchpad, a keyboard, a number of buttons, a joystick, a trackball, etc. In another embodiment, a display (not shown) can be used to display information being processed by the processor. The display can be a touch screen type display to interact with the user in addition to displaying information.

Figure 2:
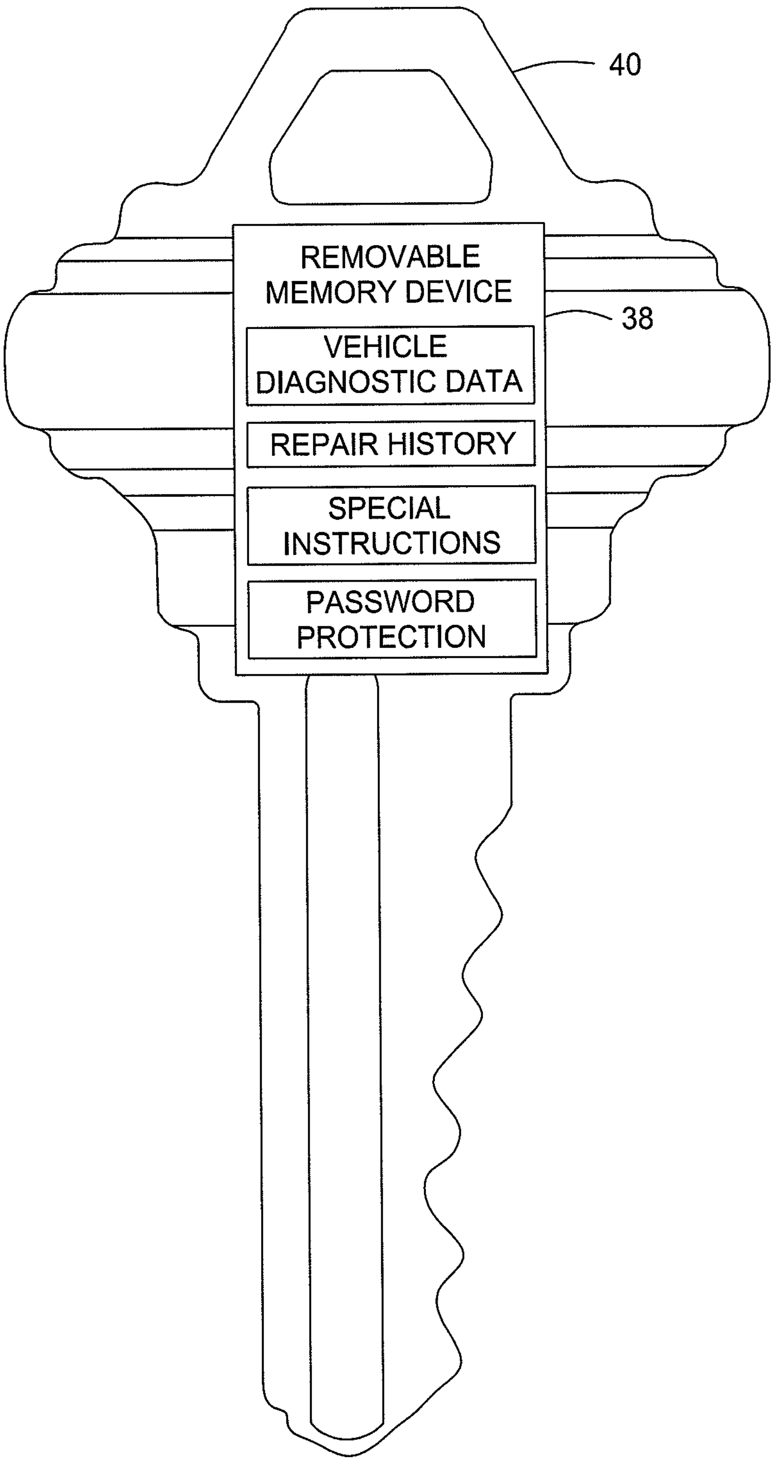
FIG. 2 is a schematic diagram of an exemplary removable memory device that may be used in conjunction with the vehicle diagnostic tool illustrated in FIG. 1.

FIG. 2 is a schematic diagram of an exemplary removable memory device 38 that may be used in conjunction with the vehicle diagnostic tool 10 illustrated in FIG. 1. As illustrated in FIG. 2, the removable memory device 38 may be configured to store at least a portion of the maintenance history of the vehicle 12. For example, all records related to oil changes that have previously been performed on the vehicle 12 may be stored on the removable storage device 38 and/or a list of all components that have been replaced and/or repaired within the vehicle may be stored thereon. This will allow the owner to determine the cost and types of repairs done over the life of the vehicle.

In addition, the device 38 may be configured to store special technical instructions related to future testing of the vehicle 12. For example, if a technician diagnosing the vehicle 12 notices that a component is not yet ready for replacement but probably will need replacement at the time of the next oil change, a note may be added to the removable memory device 38 advising the next technician to pay particular attention to that component.

In one embodiment, the removable memory device 38 illustrated in FIG. 2 is incorporated in a key 40. More particularly, the removable memory device 38 illustrated in FIG. 2 is incorporated in a key that is configured to start the vehicle 12 illustrated in FIG. 1 (i.e., an ignition key). As such, the chance of the owner of the vehicle 12 accidentally misplacing the maintenance history of the vehicle 12 is relatively low since most people do not misplace their car keys for very long. Also, according to certain embodiments of the present invention, the key 40 is actually an electronic key fob. This fob may be capable, for example, of activating such things as a remote keyless entry system of the vehicle 12 or an automatic garage door opening system where the vehicle 12 is typically stored (e.g., at the vehicle owner's home). In one embodiment, the memory device may be built into or integral with the key or fob.

When receiving or transferring data from the diagnostic tool 10, the removable memory device 38 may be interfaced (i.e., connected) with the diagnostic tool 10 in any manner that will become apparent to one of skill in the art upon practicing one or more embodiments of the present invention. For example, according to certain embodiments of the present invention, the memory device 38 may be separated from the key 40 and inserted directly into an appropriately designed interface of the diagnostic tool 10. In another embodiment, the memory device may have additional extensions that "flip out" so that a connection can be made between the memory device and the diagnostic tool 10 without the memory device being removed from key 40.

In the unlikely event of loss or theft, according to certain embodiments of the present invention, the removable memory device 38 includes password protection. In other words, before being able to access any other data on the device 38, a password, often selected by the owner of the vehicle 12, may have to be provided. In another embodiment, the removable memory device 38 may include access protection such as biometrics, such a fingerprint or DNA information. This measure safeguards, for example, personal information about the owner that may be on the device 38 (e.g., the owner's address).

Figure 3:
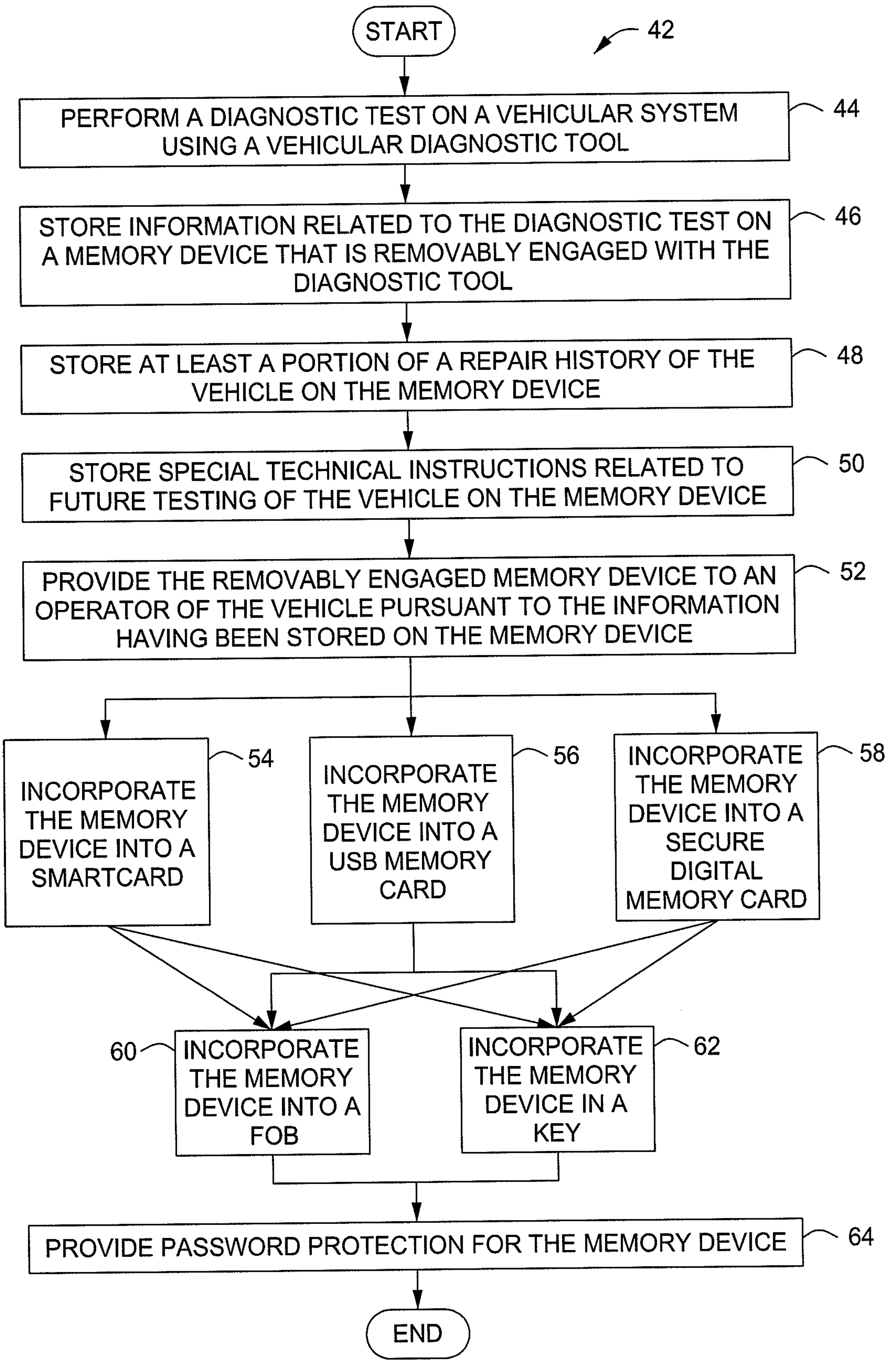
FIG. 3 is a flowchart illustrating the steps a method of collecting and storing vehicle data according to an embodiment of the present invention.

FIG. 3 is a flowchart 42 illustrating the steps a method of collecting and storing vehicle data according to an embodiment of the present invention. Step 44 of the flowchart 42 specifies performing a diagnostic test on a vehicular system using a diagnostic tool. This step may be implemented, for example, using the diagnostic tool 10 illustrated in FIG. 1 to perform a diagnostic test on the vehicle 12.

Once the test is performed, according to step 46, information related to the diagnostic test is stored on a memory device that is removably engaged with the diagnostic tool. Also, according to step 48, at least a portion of the repair history of the vehicle is stored in the removable memory device. In other embodiments, all repair history may be stored in the removable memory device. In addition or optionally, according to step 50, special technical instructions related to future testing of the vehicle are stored on the memory device. All of these steps 46, 48, 50 may be implemented, for example, using the above-discussed removable memory device 38.

According to step 52, the removably engaged memory device discussed above is provided to an operator of the vehicle pursuant to the above-identified information having been stored on the memory device. Typically, this step 52 is implemented by providing the memory device to the owner of the vehicle for safekeeping.

As recited in step 54, the memory device may be incorporated into a smart card. However, as recited in step 56, the memory device may alternatively be incorporated into a USB memory card instead. Also, as yet another alternative, the memory device may be incorporated into a secure digital memory card, as recited in step 58. Nonetheless, any information stored on the above-discussed removable memory device may also be stored on memory located within the diagnostic tool, thereby providing a backup memory should the removable memory device be damaged or lost.

According to certain embodiments of the present invention, as recited in step 60 of the flowchart 42, the above-discussed removable memory device is incorporated in a fob. For example, the memory device may be incorporated into an electronic fob that has the vehicle owner's automatic garage door opener controller incorporated therein. Also, as recited in step 62, the memory device may be incorporated in a key. For example, the memory device may be incorporated into the ignition key of the vehicle. Both of these steps 60, 62 reduce the likelihood of the memory device being lost by incorporating the device into items that vehicle owners tend to keep close track of on a day-to-day basis.

As specified in step 64 of the flowchart 42, password, biometric or other types of protection may be provided for the memory device. Using such a password, any information about the vehicle's owner and/or the vehicle may remain private in the event that the memory device is lost or stolen.

In another embodiment of the invention, the diagnostic data and repair information may stored remotely for access by the customer or by the current technician. A remote server, for example, may be used to store the data and information and may be accessed via a web page. The remote server can be password or biometrically protected (or other types of protection) so that only authorized users can have access to the data and information. This way should the customer lose the removable memory device, the diagnostic data and repair information can be downloaded onto another removable memory device as needed.

The repair history or diagnostic data stored on a removable memory device or at the remote location can include software that can translate the information into the format required by the current repair technician. In other words, if the diagnostic information was previously received from a diagnostic tool from SPX Corporation and the current technician uses a competitors diagnostic tool, such as a Snap-On tool, then the software can be included on the removal memory device or on the remote device to translate the stored information into a format that can be used by the Snap-On device or any other device.

In still another embodiment, the diagnostic data and repair information may be stored on the vehicle itself. In this embodiment, the vehicle includes a computing device capable of storing the diagnostic data and repair information. The data and information may be uploaded to the vehicle by or downloaded to the diagnostic device via a direct connection between the diagnostic device and the vehicle's computing device. In another embodiment, the vehicle computing device can include a memory device interface (similar to the one on the diagnostic device) to receive information on the removable memory device.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A vehicle diagnostic tool, comprising:

a vehicle interface configured to be connected to a vehicle and to communicate with the vehicle;

a processor configured to perform a diagnostic test on a system within the vehicle by communicating with the vehicle through the vehicle interface;

a removable memory device configured to store data collected during the diagnostic test and to store special technical instructions that provides information to a technician about future testing of the vehicle, wherein the removable memory device is retained by an owner of the vehicle after the diagnostic test has been performed; and a data storage interface electronically connected to the processor and configured to receive the removable memory device.

2. The vehicle diagnostic tool of claim 1, wherein the removable memory device is configured to store at least a portion of a repair history of the vehicle.

3. The vehicle diagnostic tool of claim 1, wherein the removable memory device is selected from a group consisting of a smartcard, a USB (universal serial bus) memory card, a secure digital card, and a memory stick.

4. The vehicle diagnostic tool of claim 1, wherein the removable memory device includes a security protection.

5. The vehicle diagnostic tool of claim 4, wherein the security protection is password protection or biometric protection.

6. The vehicle diagnostic tool of claim 1, wherein the removable memory device is incorporated in a fob.

7. The vehicle diagnostic tool of claim 1, wherein the removable memory device is incorporated in a key.

8. The vehicle diagnostic tool of claim 7, wherein the key is configured to start the vehicle.

9. The vehicle diagnostic tool of claim 1, wherein the removable memory device includes software configured to translate the information on the removable memory device to a format usable by a computing device.

10. A method of storing vehicle data, the method comprising:

performing a diagnostic test on a vehicle system using a vehicle diagnostic tool;

storing information related to the diagnostic test and special technical instructions that provides information to a technician about future testing of the vehicle on a removable memory device that is removably engaged with the vehicle diagnostic tool; and providing the removable memory device to an operator of the vehicle after the diagnostic test has been completed and the information having been stored on the removable memory device.

11. The method of claim 10, wherein the storing step comprises storing at least a portion of a repair history of the vehicle on the removable memory device.

12. The method of claim 10, wherein the removable memory device is selected from a group consisting of a smartcard, a USB (universal serial bus) memory card, a secure digital card, and a memory stick.

13. The method of claim 10 further comprising the step of:

providing the removable memory device with a security feature.

14. The method of claim 13, wherein the security feature is password protection or biometric protection.

15. The method of claim 10, further comprising the step of: incorporating the removable memory device in a fob.

16. The method of claim 10, further comprising the step of: incorporating the memory device in a key.

17. The method of claim 16, wherein the key is configured to start the vehicle.

18. A vehicle diagnostic tool, comprising:

means for interfacing configured to be connected to a vehicle and to communicate with the vehicle;

means for processing configured to perform a diagnostic test on a system within the vehicle by communicating with the vehicle through the means for interfacing;

means for storing configured to store data collected during the diagnostic test and to store special technical instructions that provides information to a technician about future testing of the vehicle, wherein the means for storing is retained by an owner of the vehicle after the diagnostic test has been performed; and means for receiving electronically connected to the means for processing and configured to receive the means for storing.

* * * * *